(12) United States Patent
Sekita

(10) Patent No.: US 7,215,483 B2
(45) Date of Patent: May 8, 2007

(54) ZOOM LENS SYSTEM AND IMAGE PICKUP APPARATUS HAVING THE SAME

(75) Inventor: Makoto Sekita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 11/234,658

(22) Filed: Sep. 9, 2005

(65) Prior Publication Data

US 2006/0114574 A1 Jun. 1, 2006

(30) Foreign Application Priority Data

Sep. 16, 2004 (JP) ............................. 2004-270052

(51) Int. Cl.
*G02B 15/14* (2006.01)
*G02B 13/16* (2006.01)
*G02B 27/10* (2006.01)

(52) U.S. Cl. ...................... 359/682; 359/680; 348/335; 348/340

(58) Field of Classification Search ................ 348/335, 348/340; 359/680, 681, 682
See application file for complete search history.

(56) References Cited

U.S. PATENT DOCUMENTS

| | | | |
|---|---|---|---|
| 4,647,160 A | 3/1987 | Ikemori | |
| 4,810,072 A | 3/1989 | Takahashi | |
| 4,828,372 A | 5/1989 | Betensky | |
| 4,838,666 A | 6/1989 | Shiraishi | |
| 5,715,097 A | 2/1998 | Shibayama | |
| 6,396,642 B2 | 5/2002 | Takatsuki | |
| 6,597,513 B2 | 7/2003 | Minefuji | |
| 6,618,210 B2 | 9/2003 | Noguchi | |
| 6,735,020 B2* | 5/2004 | Sekita | 359/682 |
| 6,943,962 B2* | 9/2005 | Sekita | 359/689 |
| 2003/0138245 A1 | 7/2003 | Watanabe | |
| 2005/0185287 A1* | 8/2005 | Sekita | 359/689 |
| 2005/0259334 A1* | 11/2005 | Sekita | 359/691 |
| 2006/0250700 A1* | 11/2006 | Sekita | 359/680 |

FOREIGN PATENT DOCUMENTS

| | | |
|---|---|---|
| JP | 59-018917 A | 1/1984 |
| JP | 61-267721 A | 11/1986 |
| JP | 63-135913 A | 6/1988 |
| JP | 2-118509 A | 5/1990 |
| JP | 4-217219 A | 8/1992 |
| JP | 6-201993 A | 7/1994 |
| JP | 7-261083 A | 10/1995 |
| JP | 8-327907 A | 12/1996 |
| JP | 10-213745 A | 8/1998 |
| JP | 2001-208969 A | 8/2001 |
| JP | 2002-023053 A | 1/2002 |
| JP | 2002-090625 A | 3/2002 |
| JP | 2002-277740 A | 9/2002 |
| JP | 2003-21783 A | 1/2003 |
| JP | 2003-177316 A | 6/2003 |

* cited by examiner

*Primary Examiner*—David N. Spector
(74) *Attorney, Agent, or Firm*—Canon USA, Inc.; Intellectual Property Division

(57) ABSTRACT

At least one exemplary embodiment is directed to a zoom lens system which includes, in order from an object side to an image side a first lens unit having negative optical power, a second lens unit having positive optical power, and a third lens unit having positive optical power. In zooming, a distance between the first lens unit and the second lens unit and a distance between the second lens unit and the third lens unit are changed.

12 Claims, 18 Drawing Sheets

ZOOM LENS SYSTEM AND IMAGE PICKUP APPARATUS HAVING THE SAME

BACKGROUND OF THE INVENTION

1. Field of the Invention

The present invention relates to zoom lens systems and in particular, although not exclusively, to a zoom lens system suitable for an image-capturing optical system in a digital still camera.

2. Description of the Related Art

With the recent advent of high-performance image pickup apparatuses (e.g., camera) using solid-state image pickup devices, (e.g., video cameras, digital still cameras, other image pickup devices as known by one of ordinary skill in the relevant art, and equivalents), optical systems in the image pickup apparatuses have been to use zoom lenses with higher aperture ratios and wide angles of view.

Since a camera of this type can have various optical members (e.g., a low-pass filter, a color compensating filter), that are disposed between the rear end of a lens system and an image pickup device, an optical system used in the camera is to have a relatively long back focal length (back focus). In the case of a camera with an image pickup device for color images, an optical system used in the camera requires good image-side telecentricity to avoid color shading.

Conventionally, various short-zoom two-unit lens systems have been proposed that include two lens units of a first lens unit having negative refractive power and a second lens unit having positive refractive power and that perform zooming by changing the distance between the first and second lens units. In such short-zoom optical systems, varying the magnification is realized by moving the second lens unit with positive refractive power, and compensating the displacement of the image position caused by the variations in magnification is realized by moving the first lens unit with negative refractive power. Such a lens system having the lens configuration made up of two lens units can have a zoom ratio of about 2×.

In order to make the entire lens system compact while achieving a 2× or more zoom ratio, three-unit zoom lens systems have been proposed that include three lens units in which a third lens unit having negative or positive refractive power is added to an image side of a two-unit zoom lens system and that realize a higher zoom ratio (see, for example, Japanese Patent Publication Nos. 7-003507 (corresponding to U.S. Pat. No. 4,810,072) and 6-040170 (corresponding to U.S. Pat. No. 4,647,160)).

Other conventional three-unit zoom lens systems have a long back focal length and a satisfactory telecentricity (see, for example, Japanese Patent Laid-Open Nos. 63-135913 (corresponding to U.S. Pat. No. 4,838,666) and 7-261083).

Still other conventional three-unit zoom lens systems include a relatively small number of lens elements and offer a wide angle of view (see, for example, Japanese Patent Laid-Open Nos. 2-118509, 6-201993, 8-327907 (corresponding to U.S. Pat. No. 5,715,097), 10-213745, 2001-208969 (corresponding to U.S. Pat. No. 6,396,642), and 2003-177316 (corresponding to U.S. Patent Application Publication No. 2003-138245)).

Still other conventional three-unit zoom lens systems include a first lens unit which includes two lens elements in which one is negative and the other is positive and a second lens unit including a combination lens effectively arranged (see, for example, Japanese Patent Laid-Open Nos. 2002-023053 (corresponding to U.S. Pat. No. 6,618,210) and 2002-090625 (corresponding to U.S. Pat. No. 6,618,210)).

Still other conventional three-unit zoom lens systems have a 3× or more zoom ratio (see, for example, U.S. Pat. No. 4,828,372 and Japanese Patent Laid-Open No. 4-217219).

Still other conventional three-unit zoom lens systems have a 3× or more zoom ratio and that include a relatively small number of lens elements (see, for example, Japanese Patent Laid-Open Nos. 10-213745, 2002-277740 (corresponding to U.S. Pat. No. 6,597,513), and 2003-21783).

Three-unit zoom lens systems designed for 35 mm film cameras are difficult to be directly used in image pickup apparatuses with solid-state image pickup devices because their back focal lengths are too long and their telecentricity is insufficient.

To realize both miniaturization of cameras and a higher zoom ratio of zoom lens systems, a collapsible zoom lens system is widely used which reduces the gap between the lens units when image-capturing operations are not performed so that the amount of projection of the lens system is decreased.

Generally, in the case in which many lens elements are used in each lens unit of a zoom lens system, the length of each lens unit along the optical axis is inevitably long. In addition, in the case in which the distance traveled by each lens unit during zooming and focusing operations is long, the overall length of the zoom lens system is unavoidably long and thus a desired collapsed length is not achievable, so that such a zoom lens system is difficult to be used as a collapsible zoom lens system.

SUMMARY OF THE INVENTION

At least one exemplary embodiment is directed to a zoom lens system that can have a relatively small number of lens elements compared to some conventional systems and realizes a desired angle of view at a wide angle end and a desired zoom ratio.

A zoom lens system according to at least one exemplary embodiment includes, in order from an object side to an image side, a first lens unit having negative refractive power (i.e., optical power: the reciprocal of its focal length), a second lens unit having positive refractive power, and a third lens unit having positive refractive power. Zooming is realized by changing a distance between the first lens unit and the second lens unit and a distance between the second lens unit and the third lens unit. The second lens unit includes a first lens subunit and a second lens subunit. The first lens subunit includes, from the object side to the image side, a positive lens element and a negative lens element. The second lens subunit including at least one positive lens element. The first lens subunit and the second lens subunit are disposed in this order from the object side to the image side. In this zoom lens system, the following conditions can be satisfied:

$$1.0 < |f1|/(f2 \cdot \tan \omega w) < 1.6$$

$$1.6 < f2/fw < 2.6$$

where $\omega w$ is half of the angle of view of the zoom lens system at a wide-angle end, $f1$ is the focal length of the first lens unit, $f2$ is the focal length of the second lens unit, and $fw$ is the focal length of the entire zoom lens system at the wide-angle end.

Further features will become apparent from the following description of exemplary embodiments (with reference to the attached drawings).

DESCRIPTION OF THE EMBODIMENTS

Figure 1:
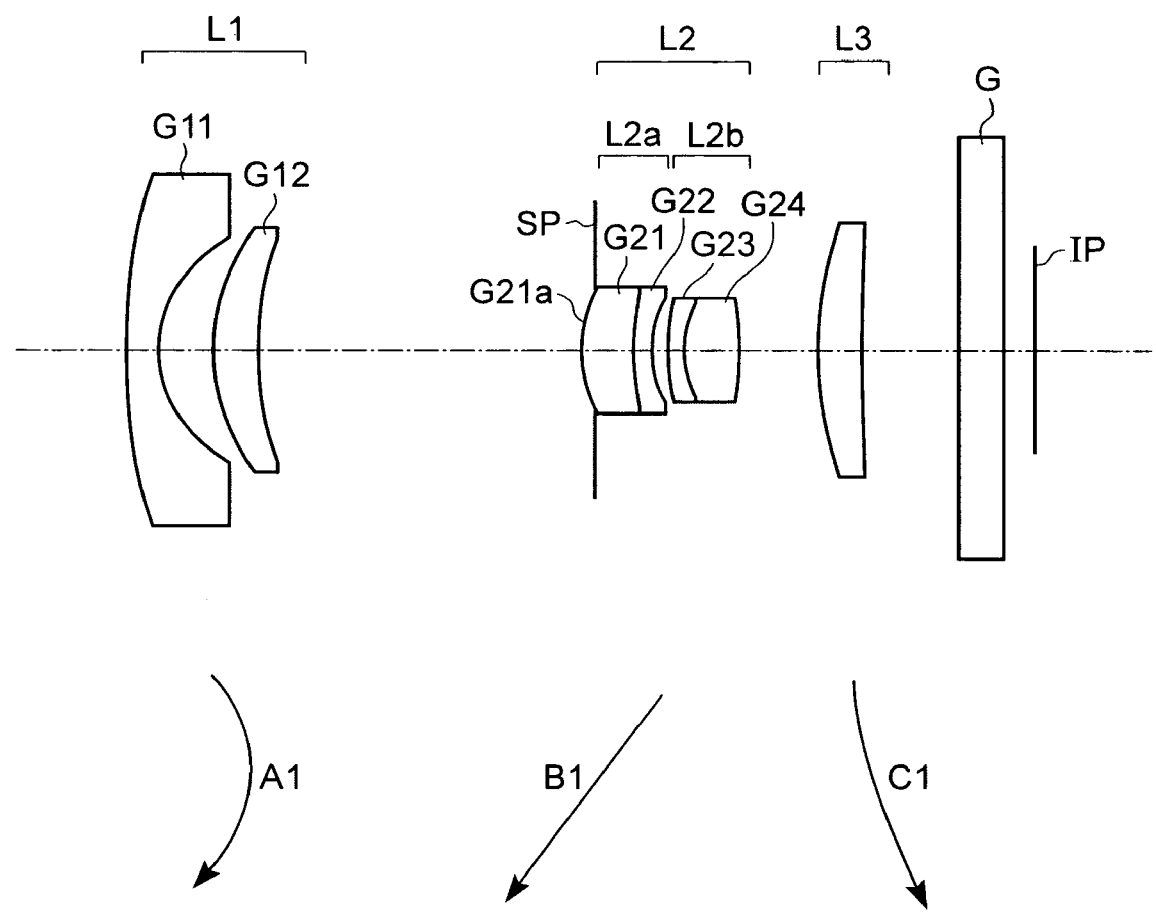
FIG. 1 illustrates a cross-sectional view of a zoom lens system according to a first exemplary embodiment.

The following description of exemplary embodiment(s) is merely illustrative in nature and is in no way intended to limit the invention, its application, or uses.

Exemplary embodiments can be operatively connected to various image pickup devices (e.g., electronic cameras, camcorders, digital still cameras, film cameras, broadcast cameras, other image pickup devices as known by one of ordinary skill, and equivalents) forming imaging systems.

Processes, techniques, apparatus, and materials as known by one of ordinary skill in the art can not be discussed in detail but are intended to be part of the enabling description where appropriate. For example lens and lens units are discussed and any material that can be used to form lenses should fall within the scope of exemplary embodiments (e.g., glass, Si). Additionally the actual size of the lens can not be discussed however any size from macro lenses to nano lenses are intended to lie within the scope of exemplary embodiments (e.g., lenses with diameters of nanometer size, micro size, centimeter size, and meter sizes).

Additionally exemplary embodiments are not limited to visual image pickup devices (e.g., optical photographic systems), for example the system can be designed for use with infrared and other wavelength imaging systems. Additionally, exemplary embodiments can be used with non-digital systems as well as digital systems (e.g., photographic systems using CCDs).

Notice that similar reference numerals and letters refer to similar items in the following figures, and thus once an item is defined in one figure, it can not be discussed or further defined in the following figures.

Exemplary embodiments of a zoom lens system and an image pickup apparatus including the zoom lens system are described below.

Figure 2:
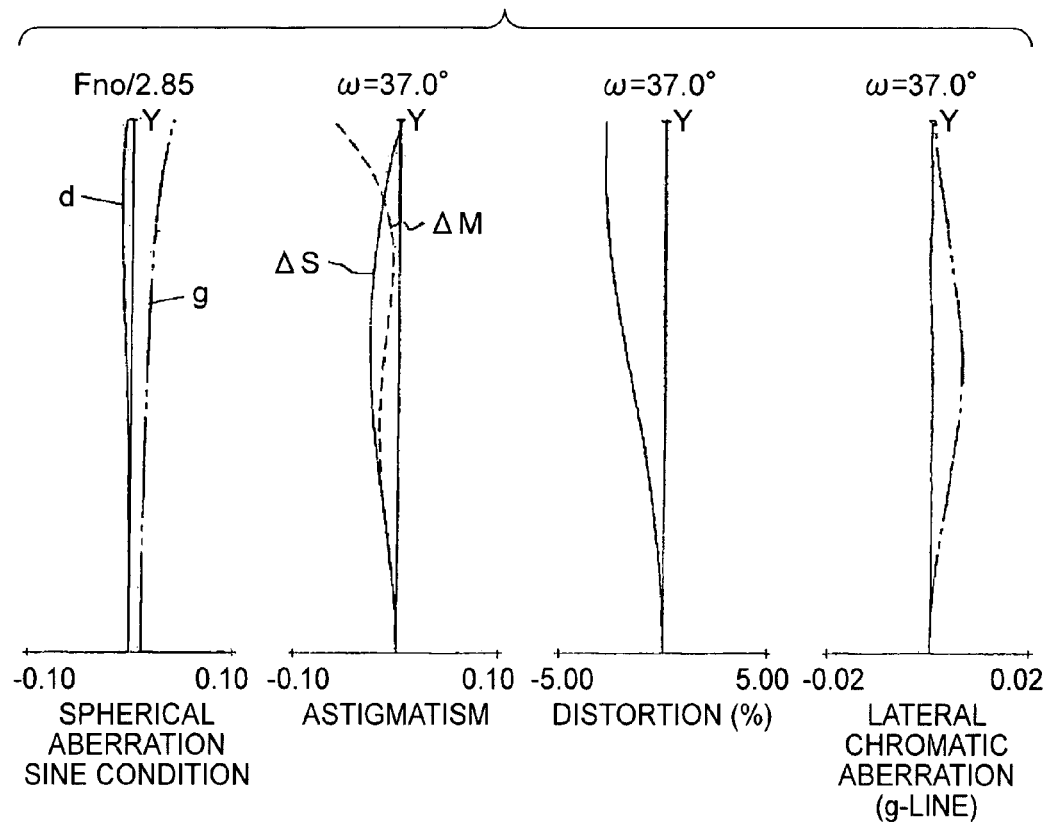
FIG. 2 shows various aberrations in the zoom lens system according to the first exemplary embodiment at the wide-angle end.
Figure 3:
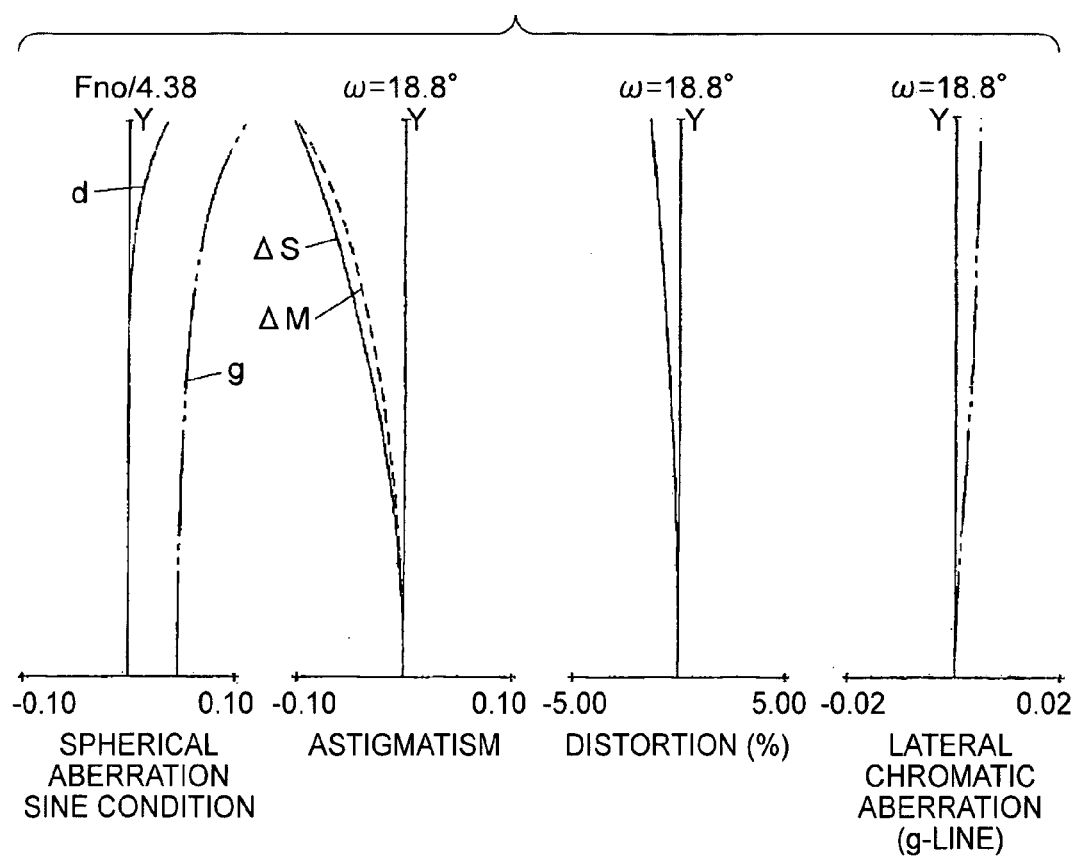
FIG. 3 shows various aberrations in the zoom lens system according to the first exemplary embodiment at an intermediate zoom position.
Figure 4:
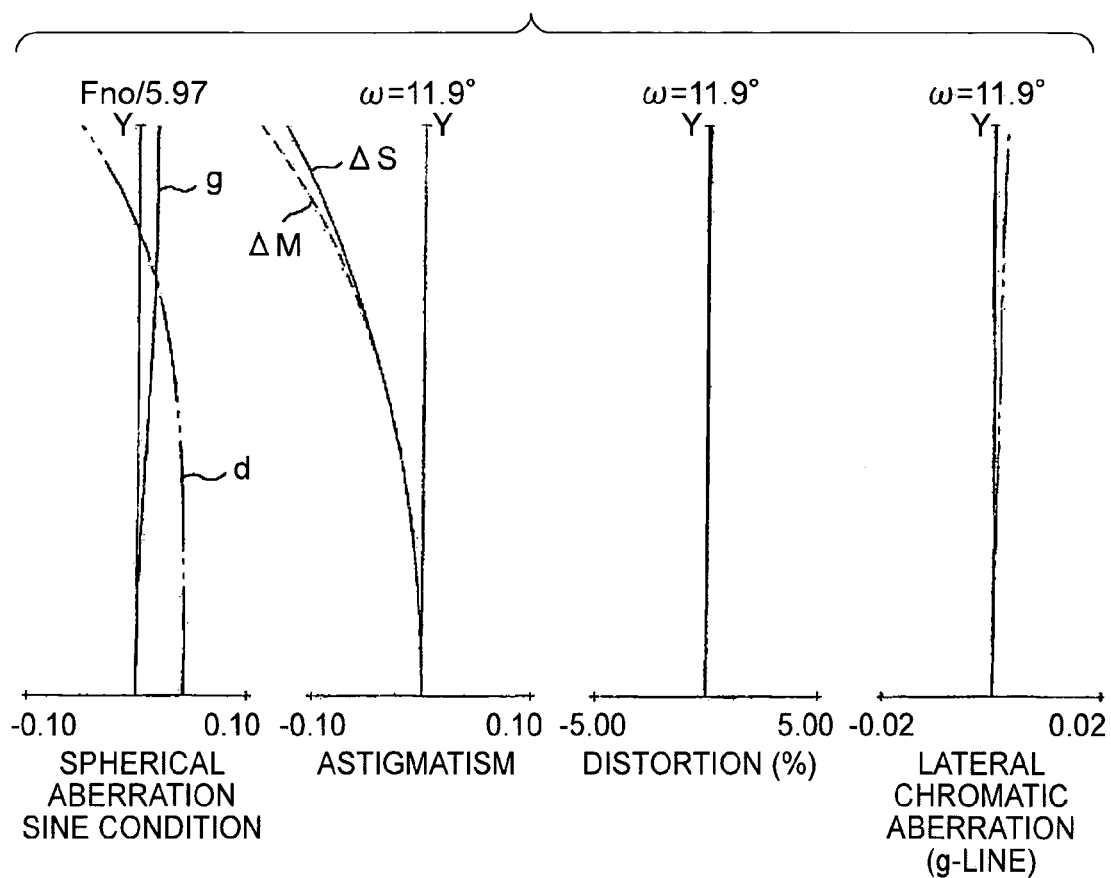
FIG. 4 shows various aberrations in the zoom lens system according to the first exemplary embodiment at the telephoto end.

FIG. 1 illustrates a cross-sectional view of the zoom lens system according to a first exemplary embodiment at the wide-angle end (shortest focal length). FIGS. 2, 3, and 4 show aberrations in the zoom lens system according to the first exemplary embodiment at the wide-angle end, at an intermediate zoom position, and at the telephoto end (longest focal length), respectively. The zoom lens system of the first exemplary embodiment can have a zoom ratio of 3.6× and an F number of about 2.9 to 6.0. Additional exemplary embodiments can have optical design values other than what are stated in the exemplary embodiments, (e.g., zoom ratio values from 1.1–10.0, ranges of F number from 1.5 to 10.0).

Figure 5:
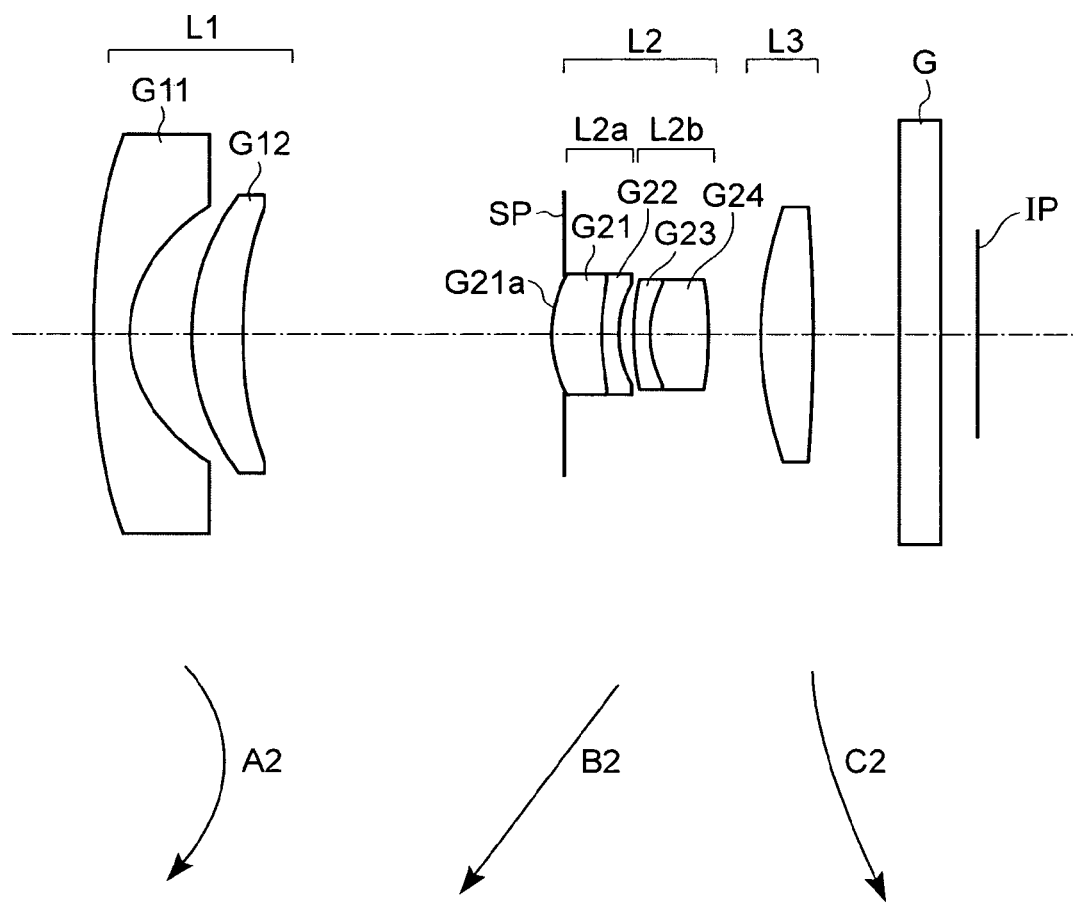
FIG. 5 illustrates a cross-sectional view of the zoom lens system according to a second exemplary embodiment.
Figure 6:
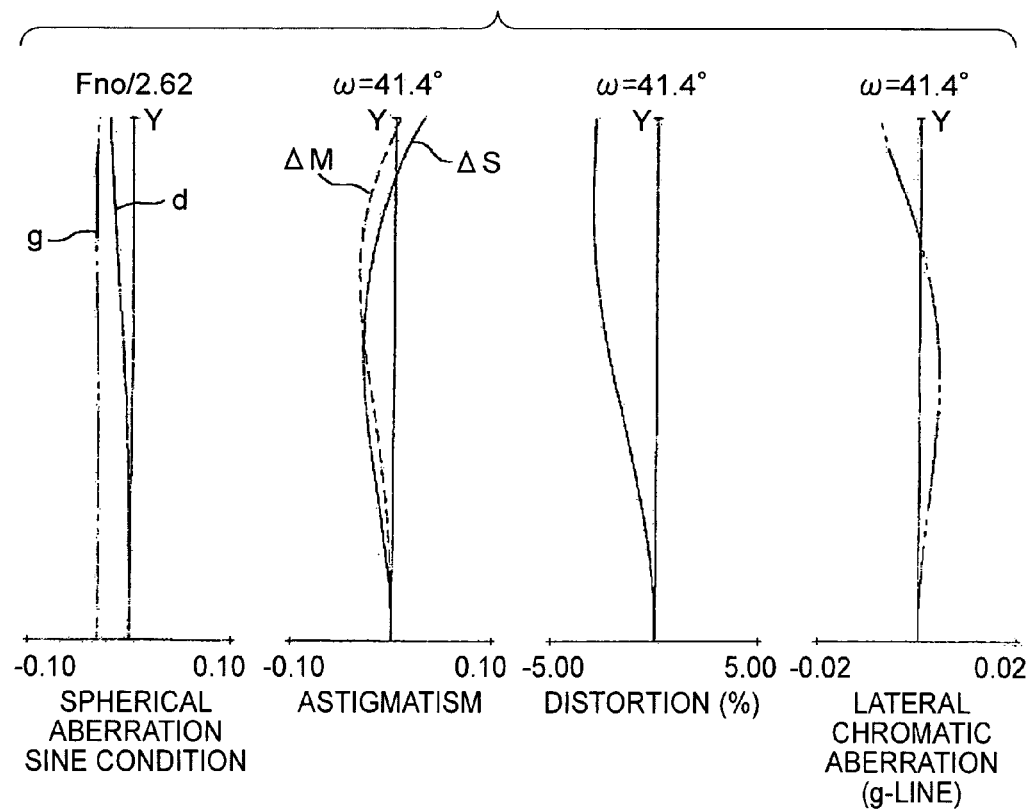
FIG. 6 shows various aberrations in the zoom lens system according to the second exemplary embodiment at the wide-angle end.
Figure 7:
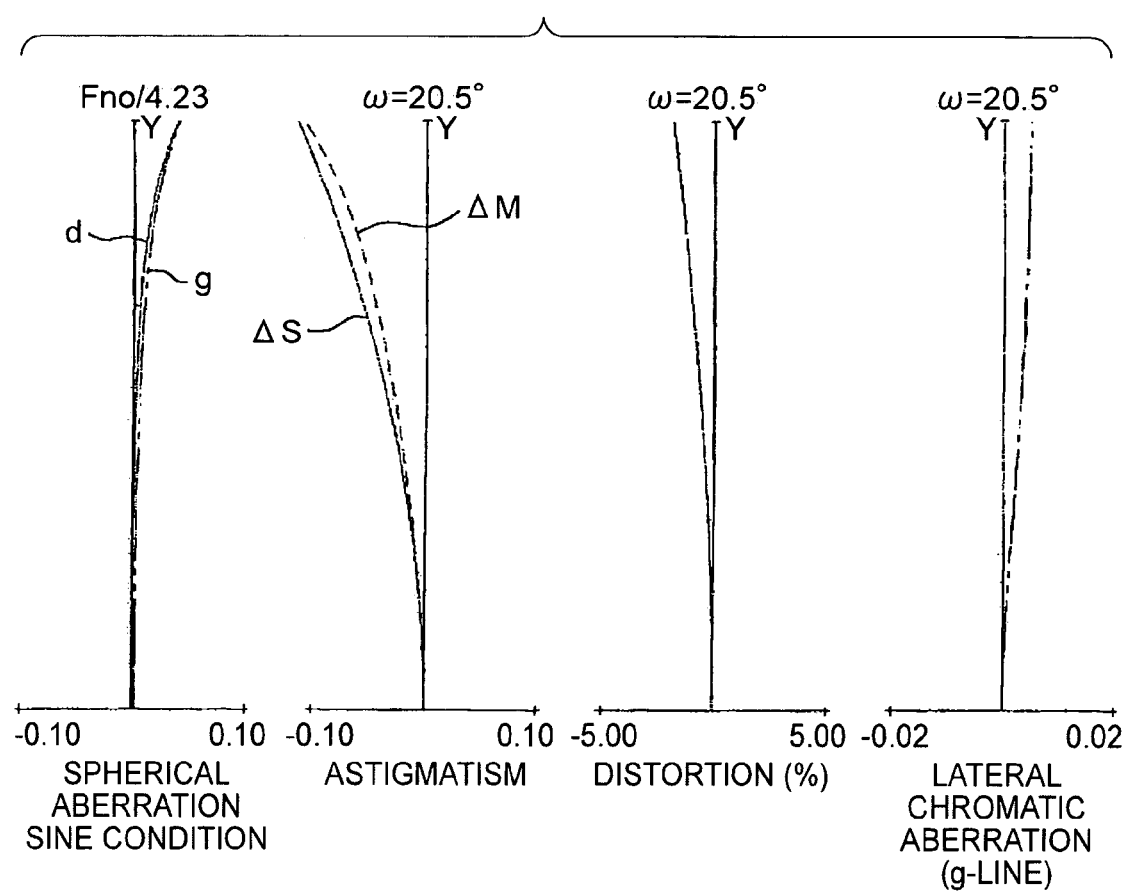
FIG. 7 shows various aberrations in the zoom lens system according to the second exemplary embodiment at an intermediate zoom position.
Figure 8:
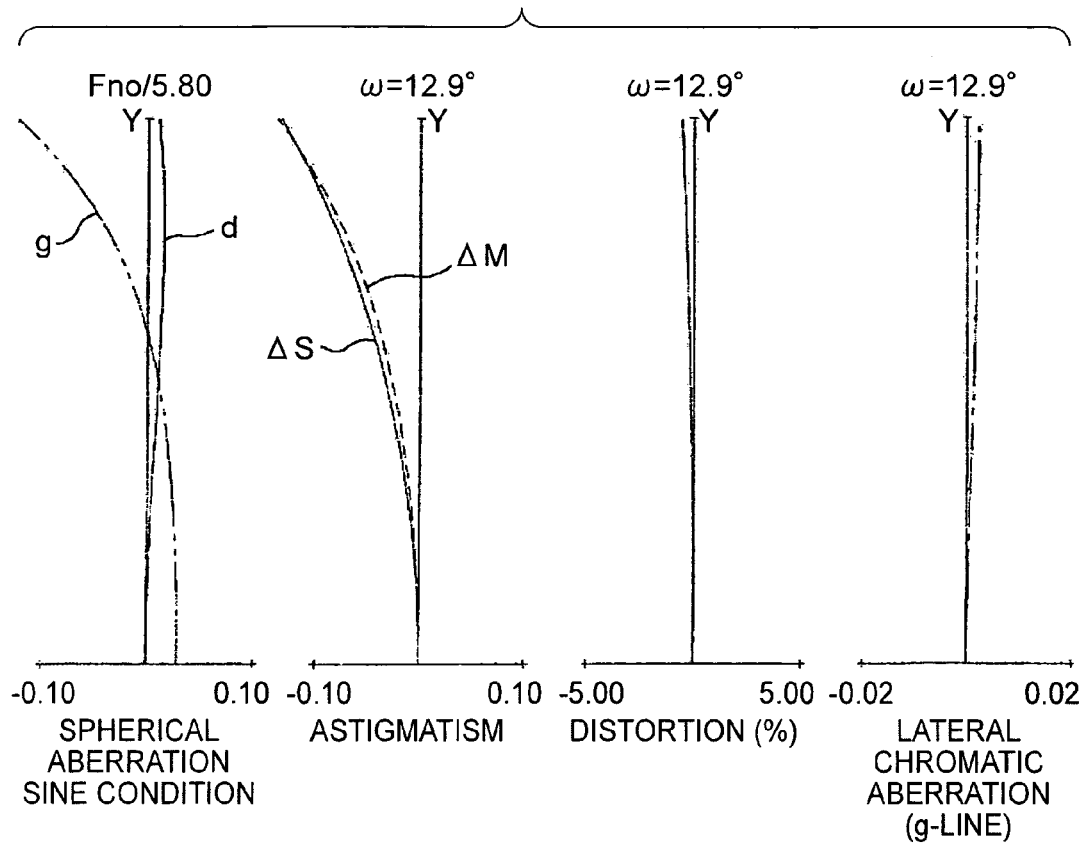
FIG. 8 shows various aberrations in the zoom lens system according to the second exemplary embodiment at the telephoto end.

FIG. 5 illustrates a cross-sectional view of the zoom lens system according to a second exemplary embodiment at the wide-angle end. FIGS. 6, 7, and 8 show aberrations in the zoom lens system according to the second exemplary embodiment at the wide-angle end, at an intermediate zoom position, and at the telephoto end, respectively. The zoom lens system of the second exemplary embodiment can have a zoom ratio of 3.9× and an F number of about 2.6 to 5.8.

Figure 9:
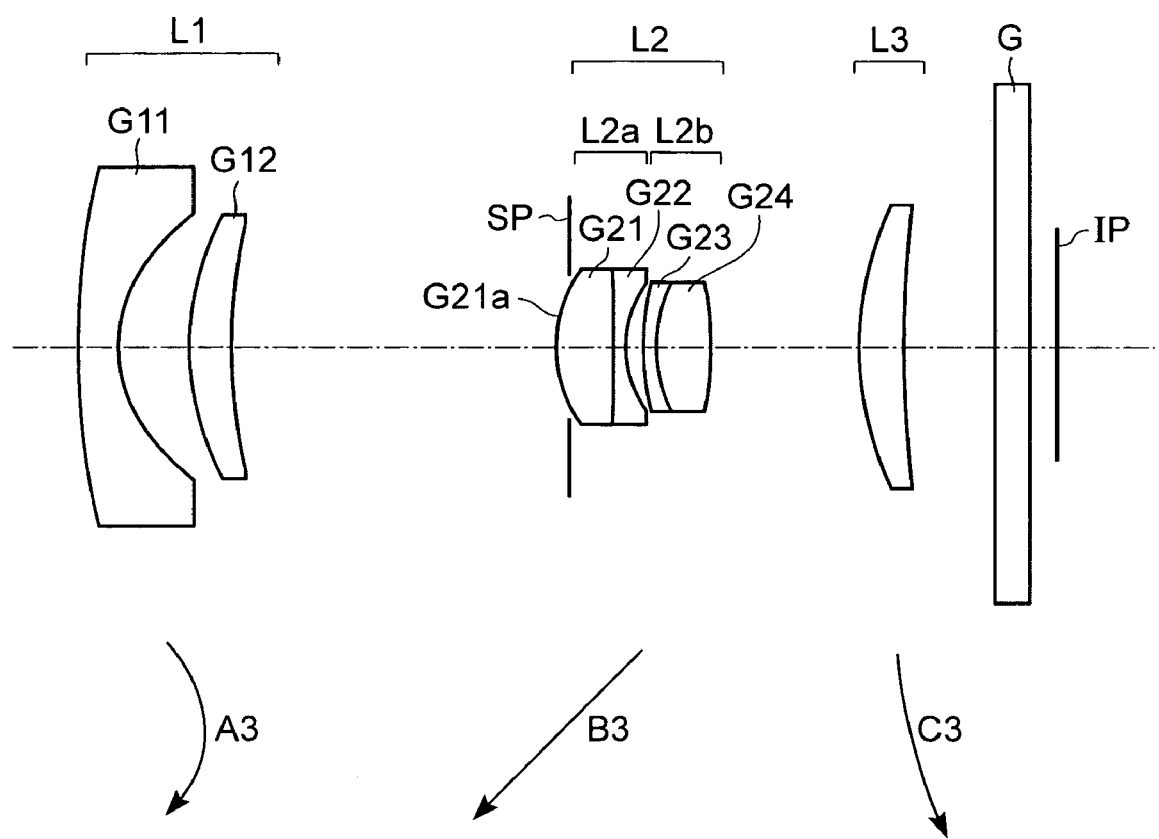
FIG. 9 illustrates a cross-sectional view of the zoom lens system according to a third exemplary embodiment.
Figure 10:
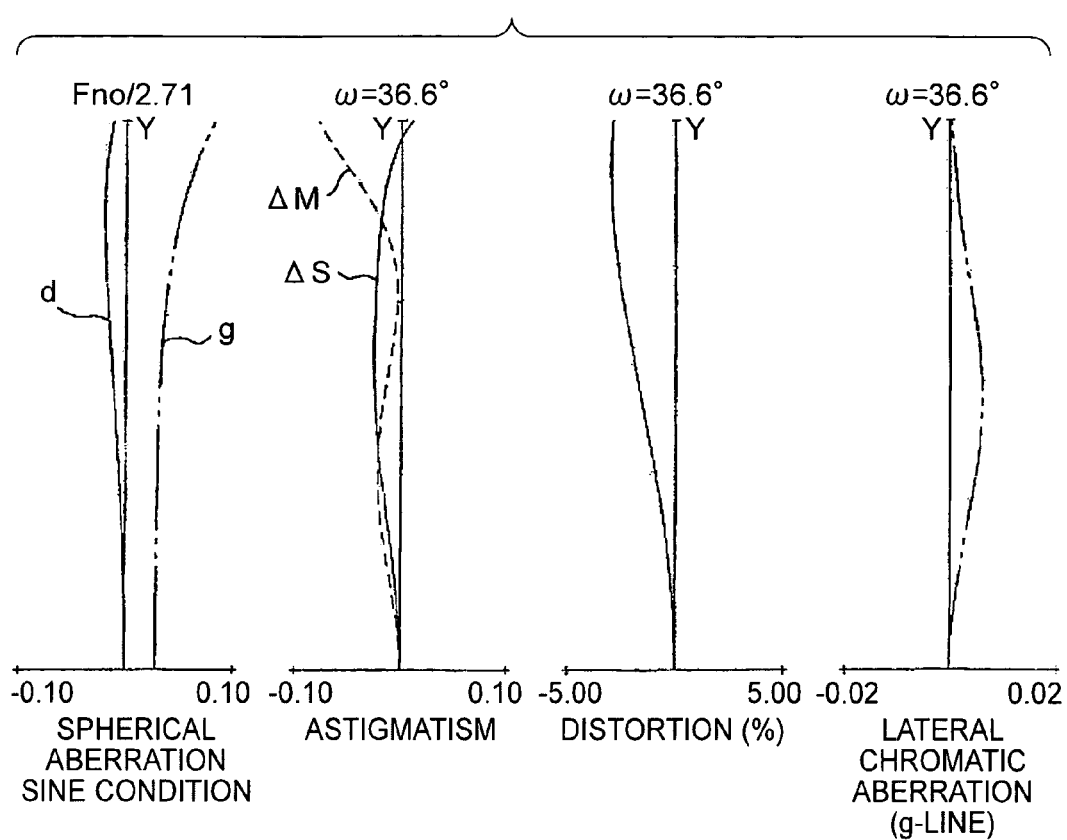
FIG. 10 shows various aberrations in the zoom lens system according to the third exemplary embodiment at the wide-angle end.
Figure 11:
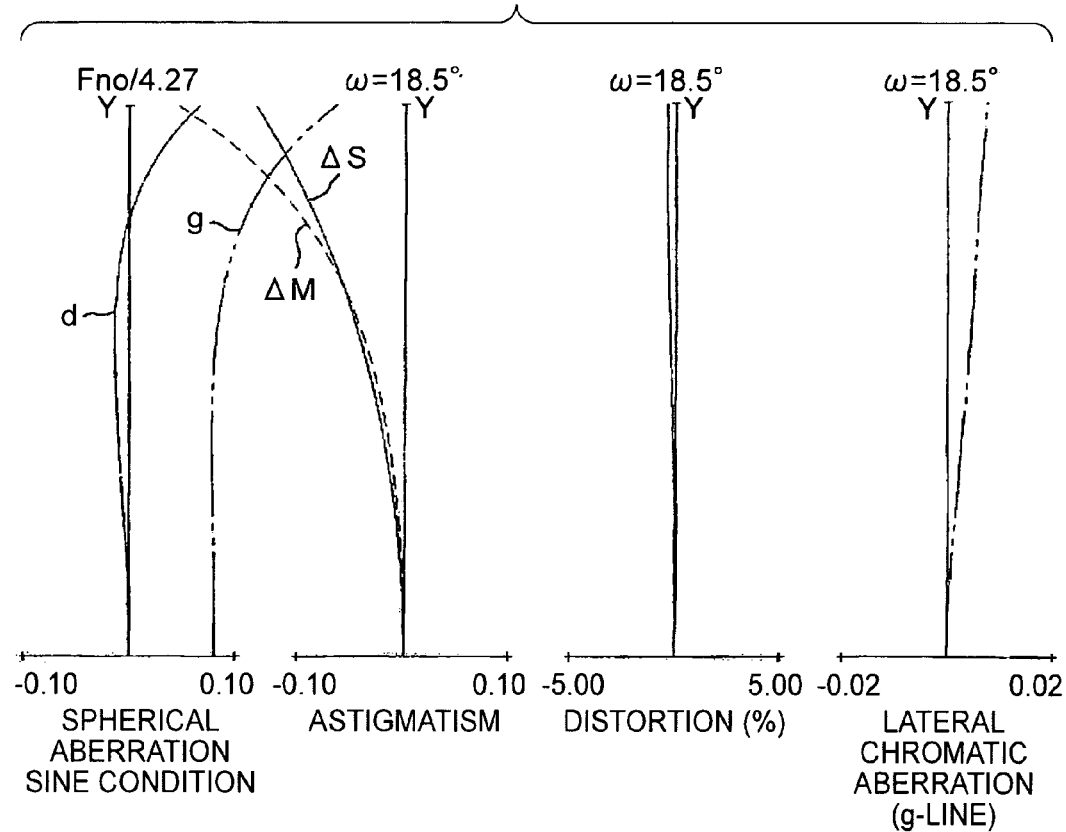
FIG. 11 shows various aberrations in the zoom lens system according to the third exemplary embodiment at an intermediate zoom position.
Figure 12:
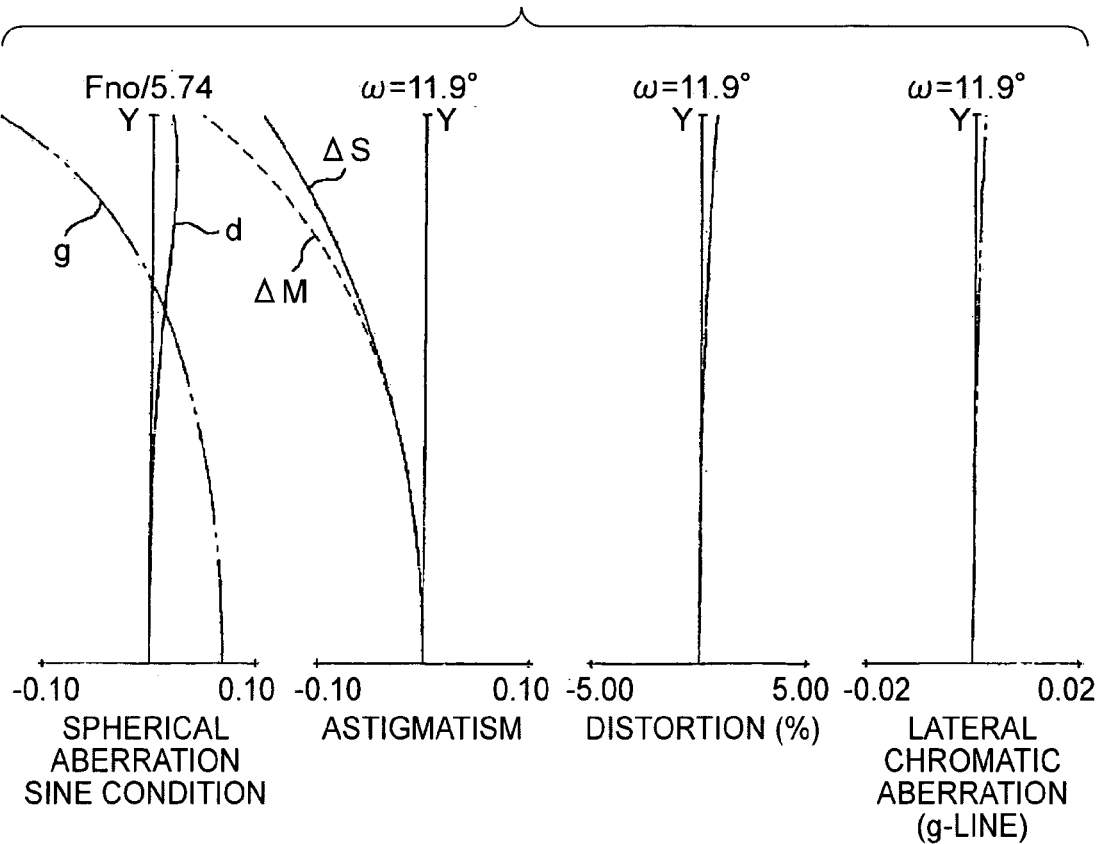
FIG. 12 shows various aberrations in the zoom lens system according to the third exemplary embodiment at the telephoto end.

FIG. 9 illustrates a cross-sectional view of the zoom lens system according to a third exemplary embodiment at the wide-angle end. FIGS. 10, 11, and 12 show aberrations in the zoom lens system according to the third exemplary embodiment at the wide-angle end, at an intermediate zoom position, and at the telephoto end, respectively. The zoom lens system of the third exemplary embodiment can have a zoom ratio of 3.5× and an F number of about 2.7 to 5.7.

Figure 13:
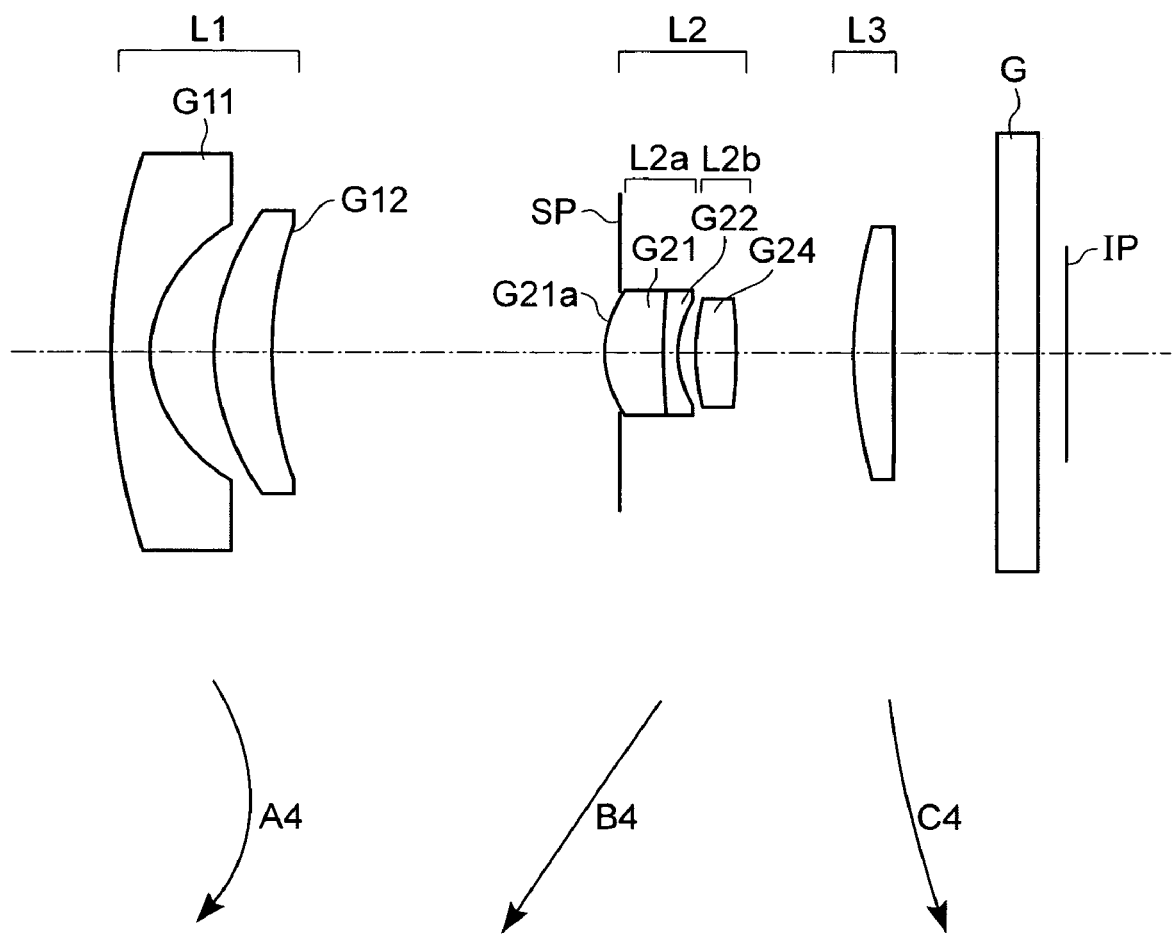
FIG. 13 illustrates a cross-sectional view of the zoom lens system according to a fourth exemplary embodiment.
Figure 14:
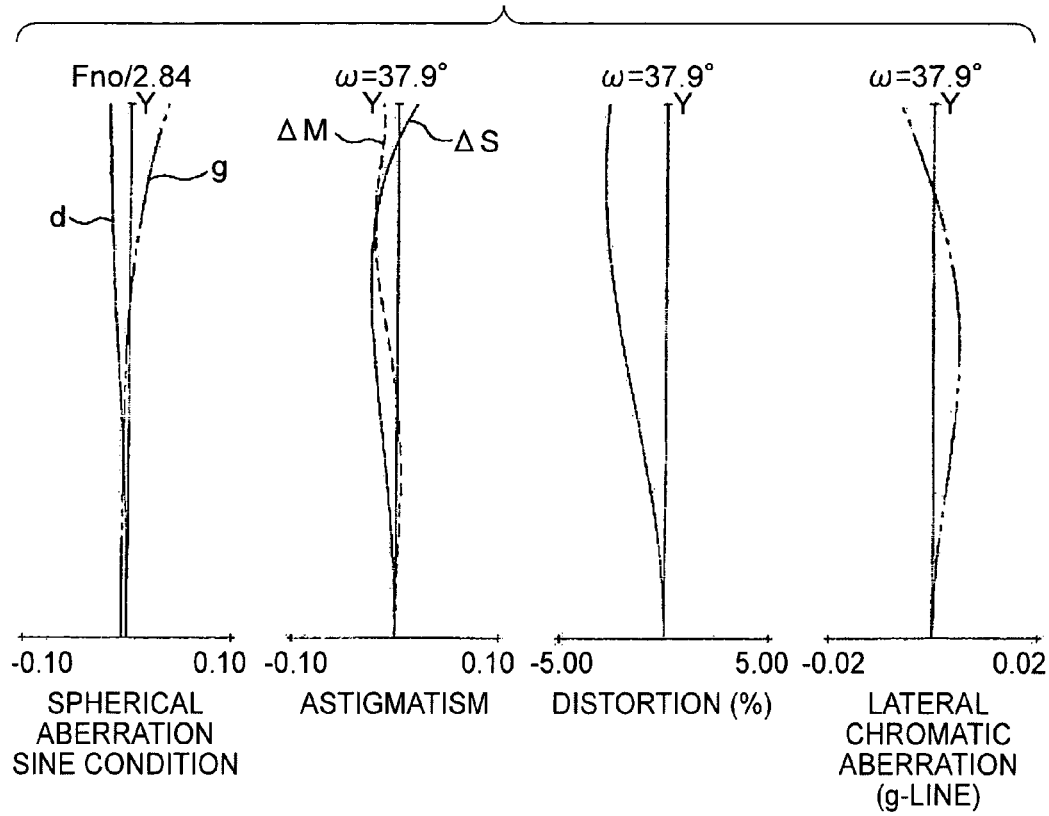
FIG. 14 shows various aberrations in the zoom lens system according to the fourth exemplary embodiment at the wide-angle end.
Figure 15:
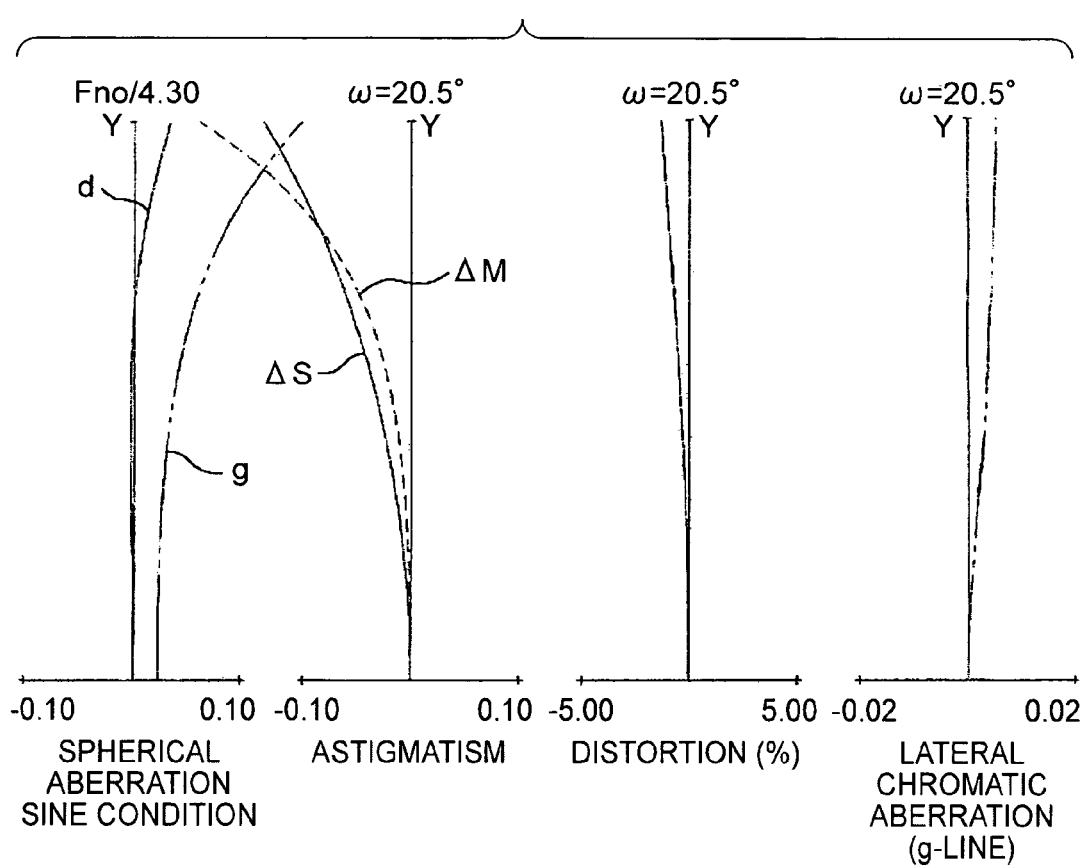
FIG. 15 shows various aberrations in the zoom lens system according to the fourth exemplary embodiment at an intermediate zoom position.
Figure 16:
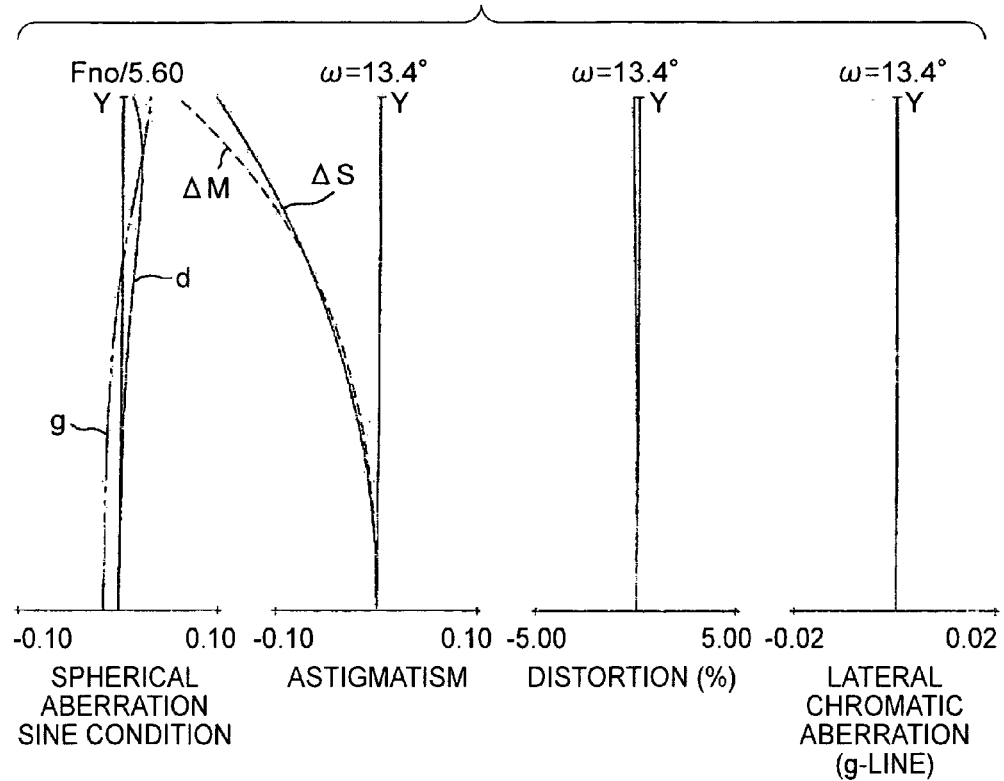
FIG. 16 shows various aberrations in the zoom lens system according to the fourth exemplary embodiment at the telephoto end.

FIG. 13 illustrates a cross-sectional view of the zoom lens system according to a fourth exemplary embodiment at the wide-angle end. FIGS. 14, 15, and 16 show aberrations in the zoom lens system according to the fourth exemplary embodiment at the wide-angle end, at an intermediate zoom position, and at the telephoto end, respectively. The zoom lens system of the fourth exemplary embodiment can have a zoom ratio of 3.3× and an F number of about 2.8 to 5.6.

Figure 17:
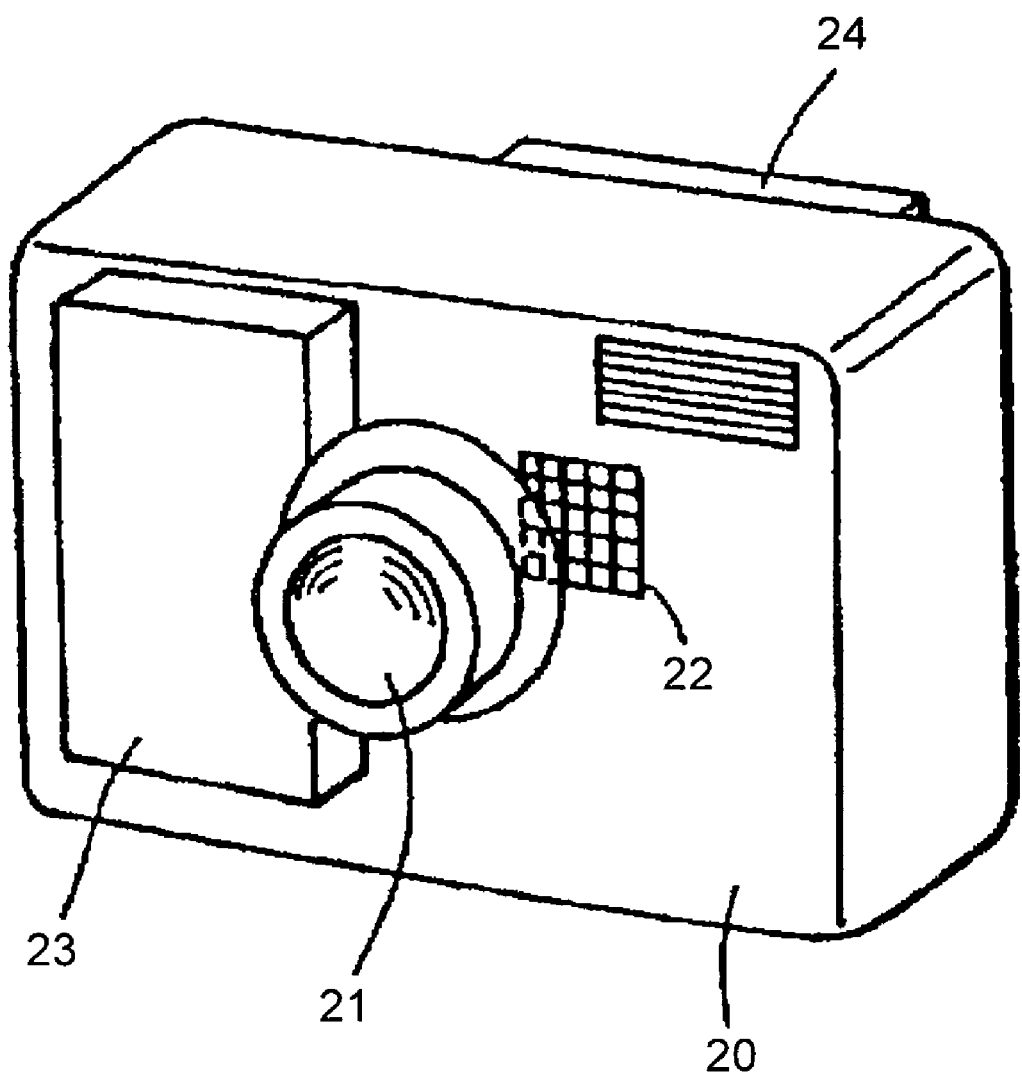
FIG. 17 illustrates a schematic view of an image pickup apparatus including the zoom lens system.
Figure 18:
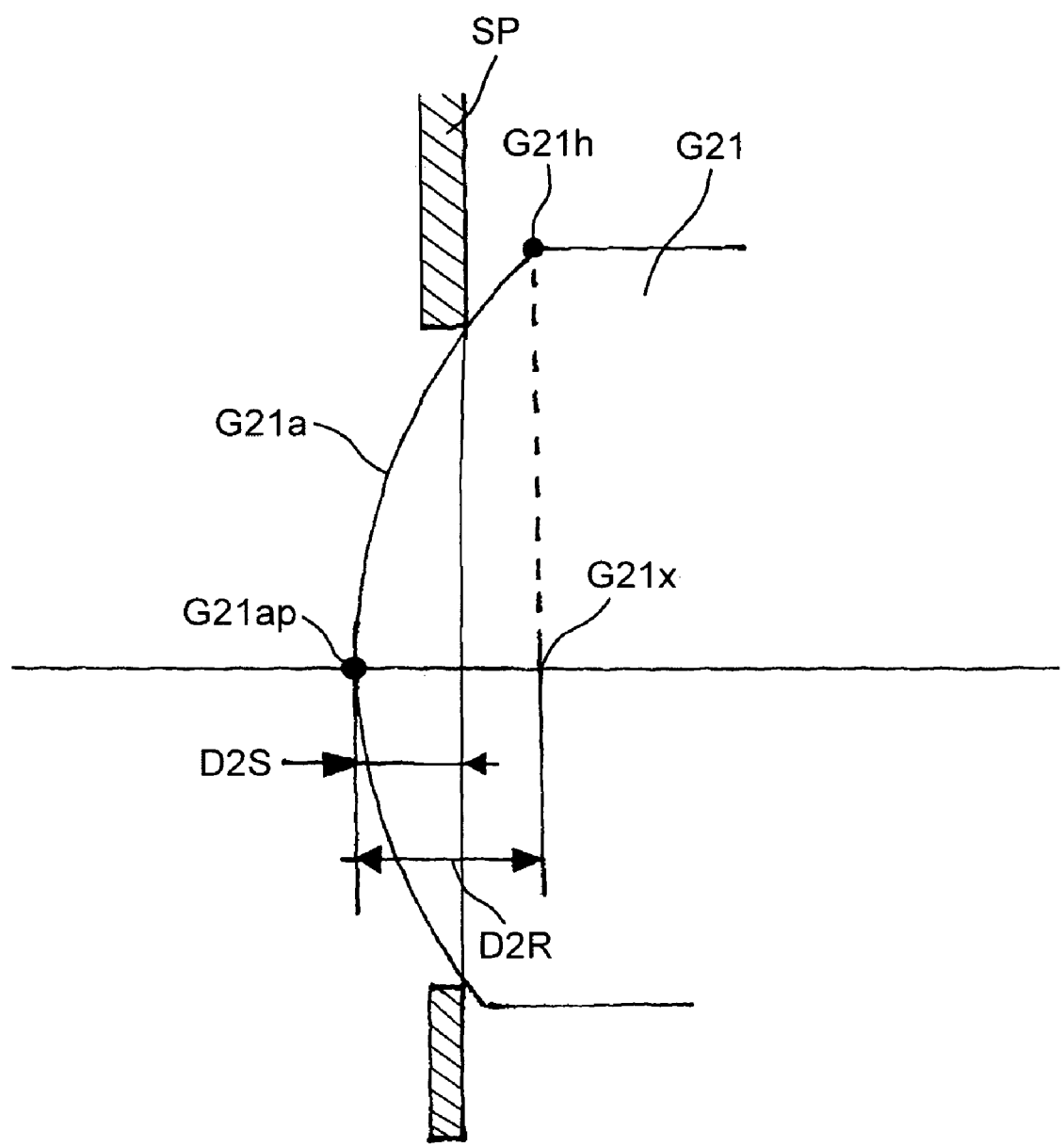
FIG. 18 illustrates an F number determining member and its surroundings in the zoom lens system.

FIG. 17 illustrates a schematic view of a digital still camera (image pickup apparatus) including a zoom lens system in accordance with at least one exemplary embodiment. FIG. 18 illustrates an F number determining member SP included in a zoom lens system and its surroundings in accordance with at least one exemplary embodiment.

The zoom lens system in each exemplary embodiment can be an image-capturing lens system used in the image pickup apparatus. In the cross-sectional views of the zoom lens system, the left side represents an object side (front) and the right side represents an image side (rear).

As shown in the cross-sectional views of in FIGS. 1, 5, 9, and 13, the zoom lens system includes a first lens unit L1 with negative refractive power (optical power: the reciprocal of its focal length), a second lens unit L2 with positive refractive power, a third lens unit L3 with positive refractive power, and the F number determining member SP (stop member) serving as an aperture stop. The components are arranged along an optical axis.

An optical block G (e.g., an optical filter, a faceplate, a crystal filter, an infrared cut filter, other optical filters as known by one of ordinary skill in the relevant arts, and equivalents). In the case in which the zoom lens system is used as an image-capturing optical system in a digital still camera or a video camera, a photosensitive surface corresponding to an imaging surface of a solid-state image pickup device (photoelectric conversion device) (e.g., a charge-coupled device (CCD) sensor, or a complementary metal-oxide semiconductor (CMOS) sensor, other image pickup devices as known by one of ordinary skill in the relevant arts, and equivalents), is disposed at an image plane IP.

The second lens unit L2 includes a first lens subunit L2a with positive refractive power and a second lens subunit L2b with negative refractive power arranged in this order from an object side to an image side with an air space that is widest in the second lens unit L2 therebetween.

In the figures showing the aberrations, "d" denotes the d-line, "g" denotes the g-line, ΔM denotes a meridional plane, ΔS denotes a sagittal plane, and a lateral chromatic aberration is represented by the g-line.

In the exemplary embodiments, the wide-angle end and the telephoto end indicate the zoom positions when a lens unit, functioning to vary the magnification (e.g., the second lens unit L2), is present at the both ends of a range in which the lens unit is mechanically movable along the optical axis.

In the zoom lens system according to at least one exemplary embodiment, while zooming from the wide-angle end to the telephoto end, the first lens unit L1 is substantially reciprocated so as to move along the optical axis with a locus convex toward the image side; the second lens unit L2 is moved to the object side along the optical axis; and the third lens unit L3 is moved to the image side along the optical axis.

In the zoom lens system according to at least one exemplary embodiment, the magnification is varied by moving the second lens unit L2, and the displacement of the image occurring when the magnification is varied is reduced by the reciprocation of the first lens unit L1 and the movement of the third lens unit L3 to the image side.

The F number determining member SP is disposed at a position described later in the vicinity of an object side surface of the second lens unit L2. Therefore, the distance between an entrance pupil and the first lens unit L1 in a wide-angle state is reduced. This facilitates not having to increase the outer diameters of the lens elements of the first lens unit L1. Moreover, off-axis aberrations are reduced by the first lens unit L1 and third lens unit L3, which are arranged in front of and behind the F number determining member SP, respectively, thus facilitating an increased optical performance without having to increase the number of lens elements.

As shown in FIG. 18, the F number determining member SP used in the zoom lens system according to at least one exemplary embodiment is disposed in a coordinate system in the optical axis direction between an apex G21ap on an object-side surface G21a of a lens element G21 which is nearest to the object side among the lens elements of the second lens unit L2 and a point G21x corresponding to, on the optical axis, an edge point G21h where the object-side surface G21a of the lens element G21 and an end face of the lens element G21 meet. The F number determining member SP can determine open F-number (maximum aperture ratio) values.

In the zoom lens system according to at least one exemplary embodiment, positioning the F number determining member SP in the way described above can reduce the length of the lens system in a collapsed state, as described below.

The lens configuration is specifically described below.

In conventional short-zoom three-unit lens systems, a stop member for determining light rays defined by the open F number is commonly disposed between a first lens unit and a second lens unit. For general short-zoom lens systems, a positive meniscus lens element with a concave surface facing the image side is disposed at the position nearest to the image side in a first lens unit.

In one such conventional zoom lens system the distance corresponding to the space between an apex of the positive meniscus lens element at its image side and the outer regions of the positive meniscus lens element cannot be reduced in the collapsed length of the zoom lens system, where the distance between the first lens unit and the second lens unit, when the zoom lens system is in a collapsed state, is reduced from that during image-capturing operations. This occurs since the concave surface of the positive meniscus lens element nearest to the image side in the first lens unit faces the image side and thus the outer regions of the positive meniscus lens element interferes with the stop member.

When the stop member is disposed between the first lens unit and the second lens unit, some amount of space is between the stop member and an apex of an object side lens element in the second lens unit. This is one factor interfering with the reduction in the collapsed length of the conventional zoom lens system.

In contrast to this, according to at least one exemplary embodiment, as described above with reference to FIG. 18, the F number determining member SP, serving as an aperture stop, is disposed between the object-side apex G21ap on the surface G21a of the lens element G21 nearest to the object side in the second lens unit L2 and the point G21x, on the optical axis, corresponding to the edge point G21h where the surface G21a of the lens element G21 and the end face of the lens element G21 meet. This arrangement eliminates a member which causes mechanical interference occurring in the collapsed state between the first lens unit L1 and the second lens unit L2 and thus makes it possible to reduce a gap between the first lens unit L1 and the second lens unit L2.

The structure of each lens unit is described below.

The first lens unit L1 includes two lens elements including, from the object side to the image side, a negative meniscus lens element G11 with a convex surface facing the object side and a positive meniscus lens element G12 with a convex surface facing the object side. The first lens unit L1 is configured to form a pupil image by gathering principal rays to the center of the F number determining member SP. When the zoom lens system is in a wide-angle condition, the amount of refraction of the principal rays is large and thus off-axis aberrations, in particular, astigmatism and distortion, tend to occur.

In view of this, the zoom lens system according to at least one exemplary embodiment uses a lens configuration that includes a negative lens element and a positive lens element and that is capable of facilitating an increase in the diameter of a lens element nearest to the object side, as is the case with ordinary wide-angle lenses.

A first surface of the negative meniscus lens element G11, facing the object side, can have an aspherical shape that can have a stronger positive refractive power at the periphery of negative meniscus lens element G11, whereas a second surface of the negative meniscus lens element G11, facing the image side, can have an aspherical shape that can have a weaker negative refractive power at the periphery thereof. Therefore, astigmatism and distortion can be reduced in a balanced manner. In addition, since the first lens unit L1 includes only two lens elements, the lens system can be more compact.

In order to suppress the off-axis aberrations caused by refraction of principal rays, the lens elements of the first lens unit L1 can have nearly concentric spherical surfaces whose common center is equal to a point, on the optical axis, corresponding to the F number determining member SP. Other exemplary embodiments can have various positions of the common center.

The second lens unit L2 includes, from the object side to the image side: the first lens subunit L2a which includes a combination lens (e.g., cemented lens) formed of the positive lens element G21 with a convex surface facing the object side and a negative lens element G22 with a concave surface facing the image side, and the second lens subunit L2b which includes a positive lens element G24 whose first lens surface (closer to the object side) is convex with respect to the object side, and whose second lens surface (closer to the image side) is convex with respect to the image side, i.e., both lens surfaces are convex with respect to their respective sides, or a combination lens can be used and formed of a negative meniscus lens element G23 with a convex surface facing the object side and the positive lens element G24 whose both lens surfaces are convex with respect to their respective sides. In the second lens unit L2, the positive lens element G21 is arranged nearest to the object side, so that an angle of refraction of the principal rays passing through the first lens unit L1 is reduced and thus the off-axis aberrations are reduced.

The positive lens element G21 is the lens in which the height of passing axial light is highest and deals with compensation of, spherical aberration and coma aberration. In the zoom lens system according to at least one exemplary embodiment, the object-side surface of the positive lens element G21 can have an aspherical shape that can have a weaker positive refractive power at the periphery thereof, thus increasingly compensating the spherical aberration and coma aberration.

The image-side surface of the negative lens element G22 disposed at the image side of the positive lens element G21 is concave, thus compensating the aberrations occurring in the object-side surface of the positive lens element G21.

In addition, the positive lens element G21 and the negative lens element G22, which is disposed at the image side of the positive lens element G21, can have substantially the same amount of sensitivity to image-plane tilt caused by eccentricity of a lens to the optical axis and have different signs of the sensitivity from each other. Therefore, the entire combination lens formed of the positive lens element G21 and the negative lens element G22 can substantially compensate the image-plane tilt, thus facilitating a lens configuration having optical performance with less deterioration caused by manufacturing error.

The third lens unit L3 includes at least one positive lens element with both surfaces convex with respect to the image side.

The third lens unit L3 deals with an increase in the refractive power of each lens unit caused by the miniaturization of an image pickup device, thus reducing the refractive power of a short zoom system which includes the first lens unit L1 and the second lens unit L2. This suppresses the occurrence of aberrations in each lens element of, in particular, the first lens unit L1, and thus can increase optical performance. In addition, the third lens unit L3 can serve as a field lens, thus facilitating image formation with telecentricity in image space, which is useful for, in particular, an image pickup apparatus using a solid-state image pickup device.

In this particular exemplary embodiment, the following relationship can be satisfied:

$$sk'=f3(1-\beta 3) \text{ (for } 0<\beta 3<1.0)$$

where sk' is the back focal length, f3 is the focal length of the third lens unit L3, and $\beta 3$ is the imaging magnification of the third lens unit L3.

In this exemplary embodiment, when the third lens unit L3 is moved (C1, C2, C3, C4) to the image side while zooming from the wide-angle end to the telephoto end, then the back focal length sk' is reduced, and the imaging magnification $\beta 3$ of the third lens unit L3 is increased in a zoom region in a telephoto condition. As a result, the third lens unit L3 deals with varying the magnification and thus the amount of movement (e.g., B1, B2, B3, B4) of the second lens unit L2 is reduced. This results in space savings and thus contributes to the miniaturization of the lens system.

In the case in which an image of an object at close range is captured using the zoom lens system according to at least one exemplary embodiment, the first lens unit L1 can be moved (e.g., A1, A2, A3, A4) to the object side to obtain increased optical performance. Alternatively, the third lens unit L3 can be moved (not shown) to the object side for focusing.

Moving the third lens unit L3 to the object side facilitates a decrease in the load on an actuator that can be used to move the first lens, which can be the heaviest lens unit, since the first lens can move a shorter distance due to the additional movement of the third lens. In addition, if the first lens unit L1 is not moved for focusing, the first lens unit L1 and the second lens unit L2 can be operatively connected to each other with a simple mechanism (e.g., a cam), and thus the two lens units can be moved together in zooming. This simplifies a mechanical structure of the zoom lens system and can improve accuracy.

Furthermore, in the case in which focusing is realized with the third lens unit L3, the position of the third lens unit L3 at the telephoto end, which can have a large amount of movement in focusing, can be more adjacent to the image side compared with that at the wide-angle end, by moving the third lens unit L3 to the image side when zooming from the wide-angle end to the telephoto end. Therefore, the total amount of movement of the third lens unit L3 for zooming and focusing can be reduced, thus facilitating the miniaturization of the lens system.

As described above, each lens unit can have a lens configuration facilitating both a desired refractive-power arrangement and aberration compensation, so that the entire lens system is miniaturized while increased optical performance is maintained.

In order to realize increased optical performance and/or miniaturize the entire lens system in the zoom lens system according to at least one exemplary embodiment, at least one of the following conditional expressions can be satisfied.

$$1.6 < f2/fw < 2.6 \tag{1}$$

$$0.2 < D2S/D2R < 0.9 \tag{2}$$

$$4.5 < \beta 2t \cdot L2t/(\beta 2w \cdot L1w) < 10.0 \tag{3}$$

$$3.5 < \sqrt{(ft/L1t)} < 8.0 \tag{4}$$

$$1.0 < \beta 3t/\beta 3w < 1.3 \tag{5}$$

$$-0.7 < (R2f+R2r)/(R2f-R2r) < -0.35 \tag{6}$$

$$1.0 < |f1|/(f2 \cdot \tan \omega w) < 1.6 \tag{7}$$

where fw is the focal length of the entire system at the wide-angle end, ft is the focal length of the entire system at the telephoto end, fi is the focal length of the i-th lens unit, D2S is the distance in the optical axis direction between the object-side apex G21ap of the positive lens element G21 and the F number determining member SP, D2R is the distance in the optical axis direction between the object-side apex G21ap of the positive lens element G21 and the edge point G21h where the surface G21a of the lens element G21 and the end face of the lens element G21 meet, β2w is the imaging magnification (in a state in which the entire system is focused on an object at infinity) of the second lens unit L2 at the wide-angle end, β3w is the imaging magnification (in a state in which the entire system is focused on an object at infinity) of the third lens unit L3 at the wide-angle end, β2t is the imaging magnification of the second lens unit L2 at the telephoto end, β3t is the imaging magnification of the third lens unit L3 at the telephoto end, L1w is the distance between the first lens unit L1 and the second lens unit L2 at the wide-angle end, L1t is the distance between the first lens unit L1 and the second lens unit L2 at the telephoto end, L2t is the distance between the second lens unit L2 and the third lens unit L3 at the telephoto end, R2f is the paraxial radius of curvature of the object-side surface of the positive lens element G21, R2r is the paraxial radius of curvature of a lens element (the lens element G24) which is nearest to the image side in the second lens unit L2, and ωw is half of the angle of view of the zoom lens system at the wide-angle end defined by an imaging surface of a solid-state image pickup (the diagonal length of the surface) and the focal length of the zoom lens system.

The technical meanings of the conditional expressions described above are explained below.

In conditional expression (1), if f2/fw is larger than the upper limit, the amount of movement of the second lens unit L2 in zooming is increased and thus the overall length of the optical system is longer. If f2/fw is smaller than the lower limit, the overall length of the optical system is short, but the focal length of the second lens unit L2 is short. This can make it difficult to compensate the aberrations in the entire zoom region.

In conditional expression (2), if D2S/D2R is smaller than the lower limit, the image-side surface of the positive meniscus lens element G12, which is nearest to the image side, of the first lens unit L1 and the object side surface of the second lens unit L2 interfere with each other. Therefore, the collapsed length cannot be sufficiently reduced. If D2S/D2R is larger than the upper limit, the distance between the F number determining member SP and the first lens unit L1 is increased and thus the diameter of the first lens unit L1 is increased.

In conditional expression (3), if β2t·L2t/(β2w·L1w) is smaller than the lower limit, the distance L1w is relatively increased and thus the diameter of the first lens unit L1 is disadvantageously increased. If β2t·L2t/(β2w·L1w) is larger than the upper limit, the overall length of the lens system at the telephoto end is longer than that at the wide-angle end and thus sufficient reduction in the collapsed length can be difficult.

In conditional expression (4), if the square root of (ft/L1t) is smaller than the lower limit, the distance L1t between the first lens unit L1 and the second lens unit L2 at the telephoto end is increased and thus the overall length of the lens system is increased. If the square root of (ft/L1t) is larger than the upper limit, the distance L1t is too short and thus the possibility of interference between the first lens unit L1 and the second lens unit L2 depending on manufacturing error arises.

In conditional expression (5), if β3t/β3w is smaller than the lower limit, the effect of increasing the zoom magnification caused by the third lens unit L3 is not produced and this leads to a disadvantage against enhancement of the zoom ratio. If β3t/β3w is larger than the upper limit, the amount of movement of the third lens unit L3 from the wide-angle end to the telephoto end is increased and thus more space for the movement of the third lens unit L3 is needed leading to a less compact shape with a larger collapsed length.

In conditional expression (6), if (R2f+R2r)/(R2f−R2r) is smaller than the lower limit, compensation of the spherical aberration can be insufficient. If (R2f+R2r)/(R2f−R2r) is larger than the upper limit, it can be difficult to shorten, in particular, the back focal length at the telephoto end.

In conditional expression (7), if |f1|/(f2·tan ωw) is smaller than the lower limit, the diameter of the front lens element and the amount of movement of the second lens unit L2 in zooming are increased and thus the overall length of the optical system becomes longer. If |f1|/(f2·tan ωw) is larger than the upper limit, the overall length of the optical system is reduced, but the focal length of the second lens unit L2 is reduced. Thus making it difficult to compensate the aberrations in the entire zoom region.

At least one exemplary embodiment compensates the aberrations and miniaturize the entire lens system, using the numerical ranges for the conditional expressions described above as follows:

$$1.8 < f2/fw < 2.4 \tag{1a}$$

$$0.3 < D2S/D2R < 0.8 \tag{2a}$$

$$4.8 < \beta 2t \cdot L2t/(\beta 2w \cdot L1w) < 8.0 \tag{3a}$$

$$3.8 < \sqrt{(ft/L1t)} < 7.5 \tag{4a}$$

$$1.0 < \beta 3t/\beta 3w < 1.2 \tag{5a}$$

$$-0.65 < (R2f+R2r)/(R2f-R2r) < -0.4 \tag{6a}$$

$$1.0 < |f1|/(f2 \cdot \tan \omega w) < 1.5 \tag{7a}$$

In at least one exemplary embodiment, instead of moving three lens units in zooming, moving two lens units (e.g., the first and the second lens units, or the first and third lens units) so as to vary the distance therebetween can be performed.

In at least one further exemplary embodiment another lens unit with small refractive power can be added in an object space of the first lens unit L1 and/or in an image space of the third lens unit L3.

The numerical examples are described below. In each numerical example, i represents the order of a surface from the object side, Ri represents the radius of curvature of an i-th surface, Di represents the distance between the i-th surface and an (i+1)-th surface, Ni represents the refractive index of the i-th lens surface with respect to the d-line, and vdi represents the Abbe number of the i-th lens surface with respect to the d-line.

Two surfaces nearest the image side constitute the optical block G.

The aspherical shape is represented by the following expression:

$$x=(h^2/R)/[1+\{1-(1+K)(h/R)^2\}^{1/2}]+Bh^4+Ch^6+Dh^8+Eh^{10} \qquad (8)$$

where the direction of travel of light rays is positive, x is the amount of displacement from an apex along the optical axis, h is the height from the optical axis in the direction substantially perpendicular to the optical axis, R is the paraxial radius of curvature, k is the conic constant, and B, C, D, and E are the aspheric coefficients.

In the numerical examples, "e-0X" means "$\times 10^{-X}$", f is the focal length, Fno is the F number, and ω is half of the angle of view. Table 1 shows the relationship between the conditional expressions described above and the numerical examples.

NUMERICAL EXAMPLE 1 f = 4.715–16.774  Fno = 2.85–5.97  2ω = 73.9°–23.9°

| | | | | | |
|---|---|---|---|---|---|
| R1 = | 50.030 | D1 = | 1.35 | N1 = 1.88300 | vd1 = 40.8 |
| R2 = | 4.759 | D2 = | 2.24 | | |
| R3 = | 8.594 | D3 = | 1.60 | N2 = 1.92286 | vd2 = 18.9 |
| R4 = | 16.681 | D4 = | variable | | |
| R5 = | stop | D5 = | −0.50 | | |
| R6 = | 4.338 | D6 = | 2.00 | N3 = 1.77250 | vd3 = 49.6 |
| R7 = | 8.707 | D7 = | 0.50 | N4 = 1.64769 | vd4 = 33.8 |
| R8 = | 3.832 | D8 = | 0.48 | | |
| R9 = | 9.572 | D9 = | 0.50 | N5 = 1.76182 | vd5 = 26.5 |
| R10 = | 3.897 | D10 = | 2.00 | N6 = 1.60311 | vd6 = 60.6 |
| R11 = | −11.842 | D11 = | variable | | |
| R12 = | 12.540 | D12 = | 1.60 | N7 = 1.60311 | vd7 = 60.6 |
| R13 = | 89.899 | D13 = | variable | | |
| R14 = | ∞ | D14 = | 1.40 | N8 = 1.51633 | vd8 = 64.1 |
| R15 = | ∞ | | | | |

| D\f | 4.715 | 10.416 | 16.774 |
|---|---|---|---|
| D4 | 11.94 | 3.84 | 0.97 |
| D11 | 3.34 | 12.32 | 20.18 |
| D13 | 3.52 | 2.04 | 1.69 |

Aspheric Coefficient

| | | | | |
|---|---|---|---|---|
| R1 | k = 0.00000e+00 | B = 4.56667e−04 | C = −7.14952e−06 | D = 4.76420e−08 |
| R2 | k = −1.53849e+00 | B = 1.59706e−03 | C= 1.32234e−05 | D = −3.93707e−07 |
| | E = 1.11975e−09 | | | |
| R6 | k = −4.37828e−01 | B = −2.86734e−06 | C = 8.92384e−06 | |

NUMERICAL EXAMPLE 2 f = 4.020–15.493  Fno = 2.62–5.80  2ω = 82.9°–25.8°

| | | | | | |
|---|---|---|---|---|---|
| R1 = | 52.516 | D1 = | 1.35 | N1 = 1.882997 | vd1 = 40.8 |
| R2 = | 4.642 | D2 = | 2.21 | | |
| R3 = | 8.112 | D3 = | 1.80 | N2 = 1.922860 | vd2 = 18.9 |
| R4 = | 14.141 | D4 = | variable | | |
| R5 = | stop | D5 = | −0.43 | | |
| R6 = | 4.284 | D6 = | 1.80 | N3 = 1.834807 | vd3 = 42.7 |
| R7 = | 11.470 | D7 = | 0.60 | N4 = 1.647689 | vd4 = 33.8 |
| R8 = | 3.662 | D8 = | 0.55 | | |
| R9 = | 9.807 | D9 = | 0.60 | N5 = 1.761821 | vd5 = 26.5 |
| R10 = | 3.704 | D10 = | 2.10 | N6 = 1.603112 | vd6 = 60.6 |
| R11 = | −11.569 | D11 = | variable | | |
| R12 = | 14.246 | D12 = | 1.80 | N7 = 1.603112 | vd7 = 60.6 |
| R13 = | −54.905 | D13 = | variable | | |
| R14 = | ∞ | D14 = | 1.50 | N8 = 1.516330 | vd8 = 64.1 |
| R15 = | ∞ | | | | |

| D\f | 4.020 | 9.482 | 15.493 |
|---|---|---|---|
| D4 | 11.45 | 3.62 | 0.89 |
| D10 | 1.88 | 11.32 | 19.26 |
| D12 | 3.00 | 1.60 | 1.71 |

Aspheric Coefficient

| | | | | |
|---|---|---|---|---|
| R1 | k = 0.00000e+00 | B = 4.64346e−04 | C = −6.64976e−06 | D = 3.62527e−08 |
| R2 | k = −1.36339e+00 | B = 1.44393e−03 | C= 2.35474e−05 | D = −5.59354e−07 |
| | E = 1.11975e−09 | | | |
| R6 | k = −4.17317e−01 | B = −6.15200e−05 | C = 8.05031e−06 | |

NUMERICAL EXAMPLE 3 f = 6.048–21.255  Fno = 2.71–5.74  2ω = 73.2°–23.9°

| | | | | | |
|---|---|---|---|---|---|
| R1 = | 71.340 | D1 = | 1.60 | N1 = 1.88300 | vd1 = 40.8 |
| R2 = | 5.719 | D2 = | 2.75 | | |
| R3 = | 10.800 | D3 = | 1.70 | N2 = 1.92286 | vd2 = 18.9 |
| R4 = | 22.275 | D4 = | variable | | |
| R5 = | stop | D5 = | −0.50 | | |
| R6 = | 5.049 | D6 = | 2.30 | N3 = 1.80610 | vd3 = 40.7 |
| R7 = | −60.222 | D7 = | 0.50 | N4 = 1.69895 | vd4 = 30.1 |
| R8 = | 4.267 | D8 = | 0.70 | | |
| R9 = | 10.417 | D9 = | 0.50 | N5 = 1.76182 | vd5 = 26.5 |
| R10 = | 5.329 | D10 = | 2.20 | N6 = 1.51633 | vd6 = 64.1 |
| R11 = | −12.663 | D11 = | variable | | |
| R12 = | 12.931 | D12 = | 1.80 | N7 = 1.60311 | vd7 = 60.6 |
| R13 = | 58.859 | D13 = | variable | | |
| R14 = | ∞ | D14 = | 1.40 | N8 = 1.51633 | vd8 = 64.1 |
| R15 = | ∞ | | | | |

| D\f | 6.048 | 13.448 | 21.255 |
|---|---|---|---|
| D4 | 13.46 | 4.31 | 0.96 |
| D11 | 6.03 | 17.36 | 26.45 |
| D13 | 3.62 | 1.58 | 1.77 |

Aspheric Coefficient

| | | | | |
|---|---|---|---|---|
| R1 | k = 0.00000e+00 | B = 2.58911e−04 | C = −2.62258e−06 | D = 1.30274e−08 |
| R2 | k = −1.21325e+00 | B = 6.70859e−04 | C= 5.95470e−06 | D = −5.54523e−08 |
| | E = 1.33713e−10 | | | |
| R6 | k = −3.46473e−01 | B = −8.50982e−05 | C = 4.56506e−07 | |

NUMERICAL EXAMPLE 4 f = 4.555–14.924   Fno = 2.84–5.60   2ω = 75.9°–26.8°

| | | | | | | | |
|---|---|---|---|---|---|---|---|
| R1 = | 33.477 | D1 = | 1.35 | N1 = | 1.882997 | vd1 = | 40.8 |
| R2 = | 4.562 | D2 = | 2.18 | | | | |
| R3 = | 7.983 | D3 = | 2.00 | N2 = | 1.922860 | vd2 = | 18.9 |
| R4 = | 14.295 | D4 = | variable | | | | |
| R5 = | stop | D5 = | −0.50 | | | | |
| R6 = | 3.579 | D6 = | 2.00 | N3 = | 1.603420 | vd3 = | 38.0 |
| R7 = | 22.964 | D7 = | 0.50 | N4 = | 1.808095 | vd4 = | 22.8 |
| R8 = | 3.561 | D8 = | 0.62 | | | | |
| R9 = | 8.843 | D9 = | 1.40 | N5 = | 1.696797 | vd5 = | 55.5 |
| R10 = | −13.442 | D10 = | variable | | | | |
| R11 = | 15.221 | D11 = | 1.40 | N6 = | 1.696797 | vd6 = | 55.5 |
| R12 = | −253.761 | D12 = | variable | | | | |
| R13 = | ∞ | D13 = | 1.40 | N7 = | 1.516330 | vd7 = | 64.1 |
| R14 = | ∞ | | | | | | |

| D\f | 4.555 | 9.483 | 14.924 |
|---|---|---|---|
| D4 | 12.00 | 4.83 | 1.50 |
| D11 | 4.00 | 12.76 | 19.00 |
| D13 | 3.58 | 1.56 | 2.04 |

Aspheric Coefficient

| | | | | |
|---|---|---|---|---|
| R1 | k = 0.00000e+00 | B = 3.21253e−04 | C = −4.38886e−06 | D = 2.64966e−08 |
| R2 | k = −1.18733e+00 | B = 1.23778e−03 | C= 1.21928e−05 | D = −1.02159e−07 |
| | E = 1.11975e−09 | | | |
| R6 | k = −2.75908e−01 | B = −3.86749e−04 | C = −8.02264e−06 | |

TABLE 1

| Conditional Expressions | Numerical Example 1 | Numerical Example 2 | Numerical Example 3 | Numerical Example 4 |
|---|---|---|---|---|
| (1) | 2.102 | 2.327 | 1.969 | 2.176 |
| (2) | 0.606 | 0.559 | 0.418 | 0.503 |
| (3) | 5.677 | 6.115 | 6.567 | 4.891 |
| (4) | 5.979 | 5.812 | 6.783 | 3.859 |
| (5) | 1.105 | 1.101 | 1.092 | 1.107 |
| (6) | −0.464 | −0.460 | −0.430 | −0.579 |
| (7) | 1.399 | 1.144 | 1.401 | 1.350 |

A zoom lens system in accordance with at least one exemplary embodiment can have a small number of lens elements with a wide angle of view, a compact size, and an increased optical performance of a 3× or more zoom ratio. This zoom lens system is suitable for many uses, for example in an image-capturing system using a solid-state image pickup device, of a collapsible type.

In addition, off-axis aberrations, in particular, astigmatism and distortion, and spherical aberrations, which can occur when the lens system has a higher aperture ratio, are increasedly reduced by efficiently introducing aspherical shapes into the lens units.

An exemplary embodiment of a digital still camera (image pickup apparatus) using a zoom lens system according to at least one exemplary embodiment as an image-capturing optical system is described below with reference to FIG. 17.

In FIG. 17, a camera body 20 incorporates a solid-state image pickup device (e.g., photoelectric conversion device) 22 for receiving an object's image formed by an image-capturing optical system 21, (e.g., a CCD sensor, a CMOS sensor) in accordance with at least one exemplary embodiment. A memory 22 is used for storing information corresponding to the object's image subjected to photoelectrical conversion. A viewfinder 24 is made from a liquid-crystal display panel or other display device as known by one of ordinary skill in the relevant art and equivalents and is used for observing the object's image formed on the solid-state image pickup device 22.

As described above, a zoom lens system in accordance with at least one exemplary embodiments is applied to the image pickup apparatus (e.g., digital still camera), thus facilitating the compact image pickup apparatus with high optical performance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions. For example, in the interest of acting as ones own lexicographer, although the following claims can cite terms such as "perpendicular", "orthogonal", "vertical", "horizontal", the intended meaning of these terms within the scope of the claims is to include arrangements of "substantially perpendicular" or "essentially perpendicular", "substantially orthogonal" or "essentially orthogonal", "substantially vertical" or "essentially vertical", and "substantially horizontal" or "essentially horizontal."

This application claims the benefit of Japanese Application No. 2004-270052 filed Sep. 16, 2004, which is hereby incorporated by reference herein in its entirety.

What is claimed is:

1. A zoom lens system comprising:
   a first lens unit having negative optical power;
   a second lens unit having positive optical power, the second lens unit including a first lens subunit and a second lens subunit, the first lens subunit consisting of a first positive lens element and a negative lens element, the first positive lens element and the negative lens element being disposed in this order from an object side to an image side, the second lens subunit including at least one second positive lens element, the first lens subunit and the second lens subunit being disposed in this order from the object side to the image side; and
   a third lens unit having positive optical power,
   wherein the first lens unit, the second lens unit, and the third lens unit are disposed in this order from the object side to the image side,
   wherein a distance between the first lens unit and the second lens unit and a distance between the second lens unit and the third lens unit are changed during zooming, and
   wherein the following conditions are satisfied:

$$1.0 < |f1|/(f2 \cdot \tan \omega w) < 1.6$$

$$1.6 < f2/fw < 2.6$$

where ωw is half of the angle of view of the zoom lens system at a wide-angle end, f1 is the focal length of the first lens unit, f2 is the focal length of the second lens unit, and fw is the focal length of the entire zoom lens system at the wide-angle end.

2. The zoom lens system according to claim 1, further comprising:
   a stop member configured to determine an open F number, the stop member being disposed between an apex of an object side surface of the positive lens element in the first lens subunit and an edge point where the object side surface and an end face of the positive lens element in the first lens subunit meet.

3. The zoom lens system according to claim 2, wherein the following condition is satisfied:

$$0.2 < D2S/D2R < 0.9$$

where D2S is the distance in an optical axis direction between the apex of the object side surface of the positive lens element in the first lens subunit and the stop member, and D2R is the distance in the optical axis direction between the apex of the object side surface of the positive lens element in the first lens subunit and the edge point where the object side surface and the end face of the positive lens element in the first lens subunit meet.

4. The zoom lens system according to claim 1, wherein while zooming from the wide-angle end to a telephoto end, the first lens unit is moved along an optical axis of the zoom lens system with a locus convex toward the image side, the second lens unit is moved to the object side along the optical axis, and the third lens unit is moved to the image side along the optical axis.

5. The zoom lens system according to claim 1, wherein the first lens unit includes a negative lens element in which both a surface facing the object side and a surface facing the image side are aspherical.

6. The zoom lens system according to claim 1, wherein the first positive lens element and the negative lens element in the first lens subunit form a combination lens.

7. The zoom lens system according to claim 1, wherein the following condition is satisfied:

$$4.5 < \beta 2t \cdot L2t/(\beta 2w \cdot L1w) < 10.0$$

where $\beta 2w$ is the imaging magnification of the second lens unit at the wide-angle end, $\beta 2t$ is the imaging magnification of the second lens unit at a telephoto end, L1w is the distance between the first lens unit and the second lens unit at the wide-angle end, and L2t is the distance between the second lens unit and the third lens unit at the telephoto end.

8. The zoom lens system according to claim 1, wherein the following condition is satisfied:

$$3.5 < \sqrt{(ft/L1t)} < 8.0$$

where ft is the focal length of the entire zoom lens system at a telephoto end, and L1t is the distance between the first lens unit and the second lens unit at the telephoto end.

9. The zoom lens system according to claim 1, wherein the following condition is satisfied:

$$1.0 < \beta 3t/\beta 3w < 1.3$$

where $\beta 3w$ is the imaging magnification of the third lens unit at the wide-angle end, and $\beta 3t$ is the imaging magnification of the third lens unit at a telephoto end.

10. The zoom lens system according to claim 1, wherein the following condition is satisfied:

$$-0.7 < (R2f+R2r)/(R2f-R2r) < -0.35$$

where R2f is the paraxial radius of curvature of an object side surface of the positive lens element in the first lens subunit, and R2r is the paraxial radius of curvature of an image side surface of a lens element nearest the image side among the lens elements in the second lens unit.

11. The zoom lens system according to claim 1, wherein the zoom lens system forms an image on a solid-state image pickup device.

12. An image pickup apparatus comprising:
a zoom lens system; and
a solid-state image pickup device configured to receive an image formed by the zoom lens system,
the zoom lens system comprising:
a first lens unit having negative optical power;
a second lens unit having positive optical power, the second lens unit including a first lens subunit and a second lens subunit, the first lens subunit consisting of a first positive lens element and a negative lens element, the positive lens element and the negative lens element being disposed in this order from an object side to an image side, the second lens subunit including at least one second positive lens element, the first lens subunit and the second lens subunit being disposed in this order from the object side to the image side; and
a third lens unit having positive optical power,
wherein the first lens unit, the second lens unit, and the third lens unit are disposed in this order from the object side to the image side,
wherein a distance between the first lens unit and the second lens unit and a distance between the second lens unit and the third lens unit are changed during zooming, and
wherein the following conditions are satisfied:

$$1.0 < |f1|/(f2 \cdot \tan \omega w) < 1.6$$

$$1.6 < f2/fw < 2.6$$

where $\omega w$ is half of the angle of view of the zoom lens system at a wide-angle end, f1 is the focal length of the first lens unit, f2 is the focal length of the second lens unit, and fw is the focal length of the entire zoom lens system at the wide-angle end.

* * * * *